(12) United States Patent
Wada

(10) Patent No.: US 10,279,679 B2
(45) Date of Patent: May 7, 2019

(54) VALVE DEVICE

(71) Applicant: NIFCO INC., Yokosuka-shi, Kanagawa (JP)

(72) Inventor: Toshio Wada, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/555,850

(22) PCT Filed: Mar. 16, 2016

(86) PCT No.: PCT/JP2016/058328
§ 371 (c)(1),
(2) Date: Sep. 5, 2017

(87) PCT Pub. No.: WO2016/152677
PCT Pub. Date: Sep. 29, 2016

(65) Prior Publication Data
US 2018/0043766 A1 Feb. 15, 2018

(30) Foreign Application Priority Data
Mar. 24, 2015 (JP) .................................. 2015-060481

(51) Int. Cl.
*B60K 15/03* (2006.01)
*B60K 15/035* (2006.01)
*F16K 24/04* (2006.01)
*F02M 37/00* (2006.01)
(Continued)

(52) U.S. Cl.
CPC ...... *B60K 15/03519* (2013.01); *B60K 15/035* (2013.01); *B60K 15/03504* (2013.01);
(Continued)

(58) Field of Classification Search
CPC ...... F16K 24/04; F16K 24/042; F16K 24/044; F16K 27/02; F16K 31/22;
(Continued)

(56) References Cited

U.S. PATENT DOCUMENTS

| 2002/0017281 A1* | 2/2002 | Crary | B60K 15/035 |
| | | | 123/516 |
| 2003/0089405 A1* | 5/2003 | Mills | B60K 15/03519 |
| | | | 137/587 |

(Continued)

FOREIGN PATENT DOCUMENTS

| JP | H07-269435 A | 10/1995 |
| JP | 2008-240711 A | 10/2008 |

(Continued)

OTHER PUBLICATIONS

PCT/ISA/210, "International Search Report for International Application No. PCT/JP2016/058328," dated Apr. 19, 2016.
(Continued)

*Primary Examiner* — Ian G Paquette
(74) *Attorney, Agent, or Firm* — Manabu Kanesaka

(57) ABSTRACT

A valve device forming a ventilation flow channel of a fuel tank includes a float valve; an inside case including a valve opening relative to the float valve at an upper portion, and housing the float valve; an outside case receiving the inside case from an upper open end, and provided with a bottom portion; and an attachment portion relative to a tank side. A flow channel which becomes one portion of the ventilation flow channel is formed between a side portion of the inside case and a side portion of the outside case, and a through hole is provided in the side portion of the inside case. Furthermore, an engagement claw relative to the outside case is provided directly above the through hole.

7 Claims, 10 Drawing Sheets

(51) Int. Cl.
*F16K 31/22* (2006.01)
*F16K 27/02* (2006.01)

(52) U.S. Cl.
CPC ........... *F02M 37/00* (2013.01); *F16K 24/042* (2013.01); *F16K 24/044* (2013.01); *F16K 27/02* (2013.01); *F16K 31/22* (2013.01); *B60K 2015/03289* (2013.01)

(58) Field of Classification Search
CPC ............ B60K 15/03504; B60K 15/035; B60K 15/03519; F02M 37/00
USPC .................................................. 137/43, 202
See application file for complete search history.

(56) References Cited

U.S. PATENT DOCUMENTS

| | | | |
|---|---|---|---|
| 2004/0149333 A1* | 8/2004 | Johansen | F16K 24/044 137/202 |
| 2005/0284539 A1 | 12/2005 | Leonhardt | |
| 2007/0068574 A1* | 3/2007 | Kito | F16K 1/36 137/202 |
| 2011/0186149 A1 | 8/2011 | Tagami et al. | |
| 2014/0091567 A1 | 4/2014 | Honda et al. | |
| 2015/0090346 A1 | 4/2015 | Erdmann et al. | |

FOREIGN PATENT DOCUMENTS

| | | |
|---|---|---|
| JP | 2011-178379 A | 9/2011 |
| JP | 2012-219621 A | 11/2012 |
| JP | 2013-147960 A | 8/2013 |
| WO | 2013/169354 A1 | 11/2013 |

OTHER PUBLICATIONS

Europe Patent Office, "Search Report for European Patent Application No. 16768580.9," dated Jan. 4, 2019.

* cited by examiner

VALVE DEVICE

FIELD OF TECHNOLOGY

The present invention relates to an improvement of a valve device attached to a fuel tank of an automobile, a two-wheeled vehicle, and the like for functioning to communicate inside and outside of the fuel tank in an open valve state.

BACKGROUND ART

As for the valve device forming a ventilation flow channel of the fuel tank, there is a valve device comprising a liquid inflow opening at a lower portion; a vapor inflow opening at a side portion; and an enclosing portion of the vapor inflow opening so as to prevent a liquid fuel from entering into the vapor inflow opening by the enclosing portion (see Patent Document 1).

PRIOR ART DOCUMENT

Patent Document

Patent Document 1: Japanese Unexamined Patent Application Publication No. H07-269435

SUMMARY OF THE INVENTION

Problems to be Solved by the Invention

A main object of the present invention is that in this kind of valve device forming the ventilation flow channel of the fuel tank, a situation wherein a fuel in a liquid state leaks to an outside of the fuel tank through the valve device can be suppressed further reliably.

Means for Solving the Problems

In order to obtain the aforementioned object, the present invention is a valve device forming a ventilation flow channel of a fuel tank, comprising a float valve; an inside case including a valve opening relative to the float valve at an upper portion, and housing the float valve; an outside case receiving the inside case from an upper open end, and provided with a bottom portion; and an attachment portion relative to a tank side, wherein a flow channel which becomes one portion of the ventilation flow channel is formed between a side portion of the inside case and a side portion of the outside case, a through hole is provided in the side portion of the inside case, and further, an engagement claw relative to the outside case is provided directly above the through hole.

According to such a structure, when the float valve is at a lower position, an inside and an outside of a tank can communicate to each other through the upper open end of the outside case, the flow channel, the through hole of the inside case, and the valve opening.

Here, if the upper open end of the outside case is positioned on an upper side more than the through hole of the inside case, one portion of the ventilation flow channel reaching the valve opening from such upper open end meanders up and down so as to prevent an outflow of a fuel in a liquid state to the outside of the tank in a state before the float valve sits as much as possible.

Also, the engagement claw is formed directly above the through hole, and such engagement claw can function as an eave of the through hole, so that even if the fuel in the liquid state enters into the flow channel from the upper open end before the float valve sits, such fuel can be prevented from entering into the through hole as much as possible.

One of preferred aspects of the present invention is that an engagement hole relative to the engagement claw of the inside case is provided in the outside case. Also, one of the preferred aspects of the present invention is that in the side portion of the inside case, there is provided an engaged portion receiving an engagement piece provided in a structural member of the attachment portion by an elastic deformation, and engaging the engagement piece by an elastic return at a receiving end position.

Also, one of the preferred aspects of the present invention is that the engaged portion is positioned on a lower side more than the upper open end of the outside case. In such a case, the engaged portion of the inside case engaged with the engagement piece of the structural member of the attachment portion is covered with the outside case, so that the elastic deformation of the engaged portion in a direction of releasing such an engagement is suppressed, and an engagement state between the structural member and the inside case can be stably secured.

Also, one of the preferred aspects of the present invention is that a plurality of through holes is provided, and the engaged portion is positioned between adjacent through holes in a peripheral direction of the inside case. In such a case, the through holes can be formed on an upper side of the valve device as much as possible, and can appropriately adapt a high draft of the fuel tank.

Effect of the Invention

In the valve device according to the present invention, a situation wherein the fuel in the liquid state leaks to the outside of the fuel tank through the valve device can be suppressed further reliably.

BEST MODES OF CARRYING OUT THE INVENTION

Figure 1:
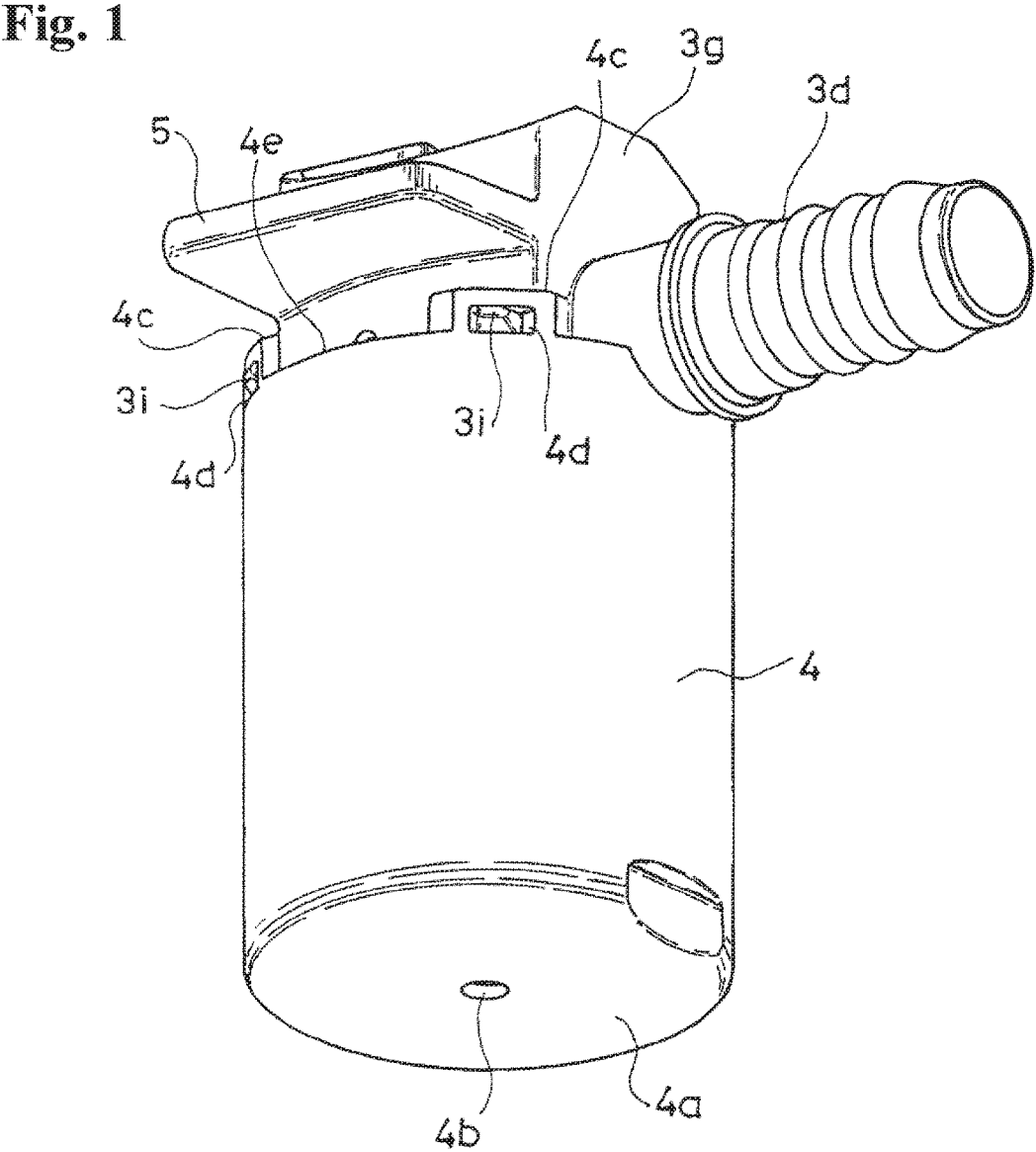
FIG. 1 is a perspective view of a valve device (the first example) according to one embodiment of the present invention.

Hereinafter, based on FIG. 1 to FIG. 10, typical embodiments of the present invention will be explained. A valve device according to the present embodiment is attached to a fuel tank of an automobile, a two-wheeled vehicle, and the like so as to form a portion of a ventilation flow channel 1 of such fuel tank, and functions to communicate inside and outside of the fuel tank in an open valve state.

First Example

The valve device (the first example) shown in FIG. 1 to FIG. 5 is provided in the fuel tank using a bracket (not shown in the drawings) provided inside the fuel tank.

Such valve device comprises a float valve 2, an inside case 3 housing the float valve 2, an outside case 4 housing the inside case 3, and an attachment portion 5 relative to a tank side. In this example, the attachment portion 5 is integrally provided with the inside case 3. Such float valve 2, inside case 3, and outside case 4 are typically made of plastic.

Figure 2:
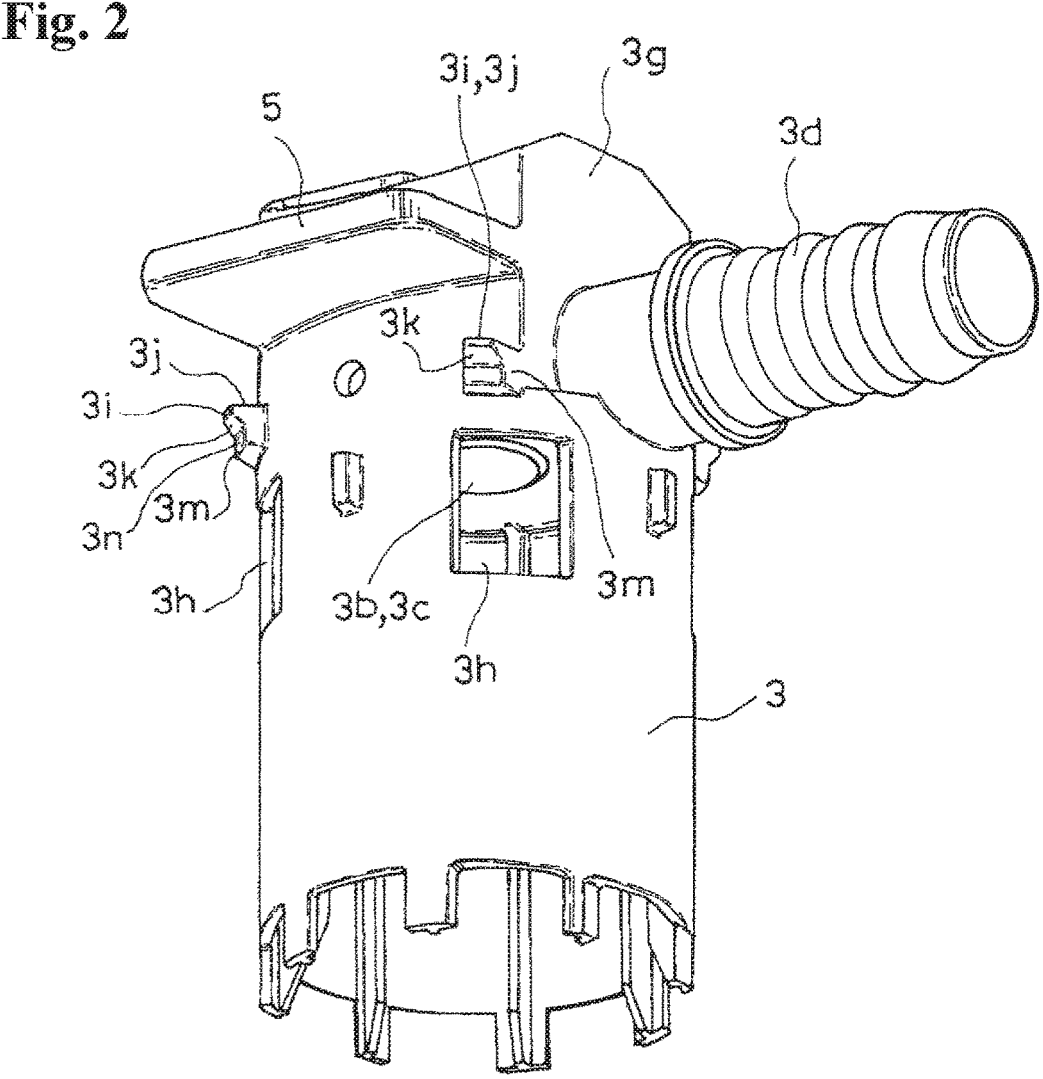
FIG. 2 is a perspective view of an inside case forming the valve device of the first example.
Figure 3:
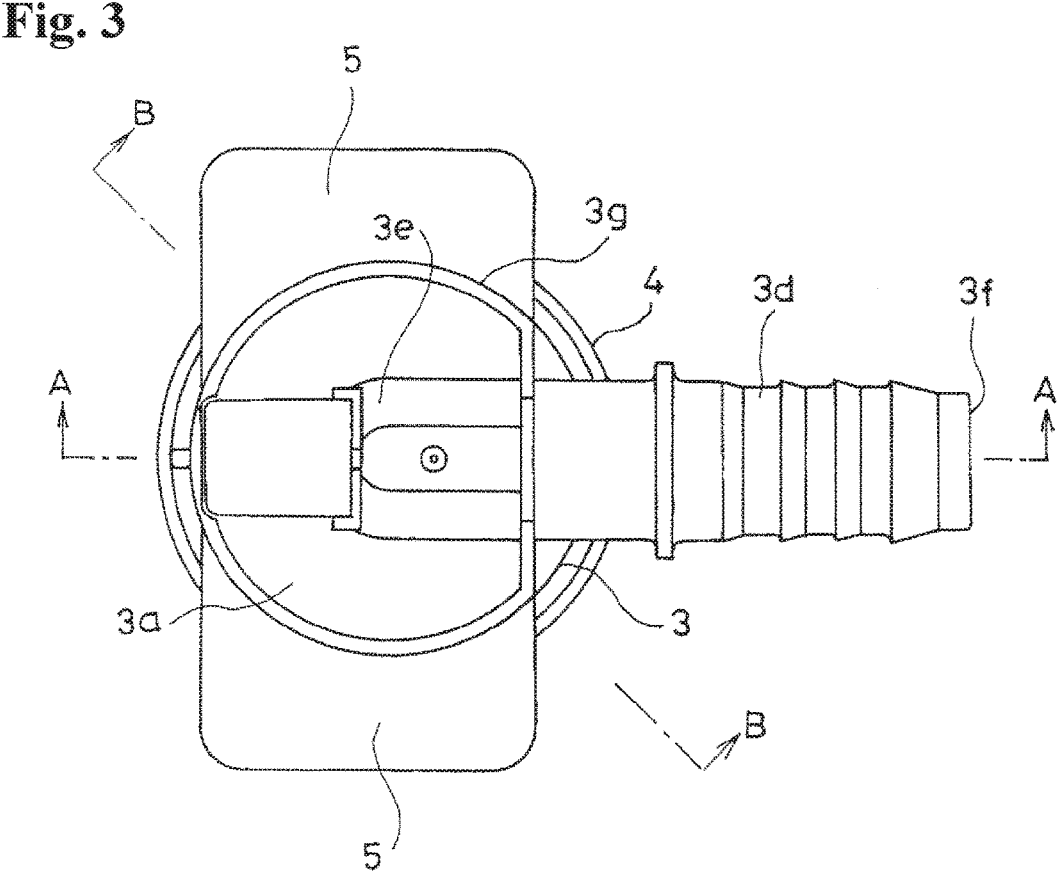
FIG. 3 is a plan view of the valve device of the first example.
Figure 4:
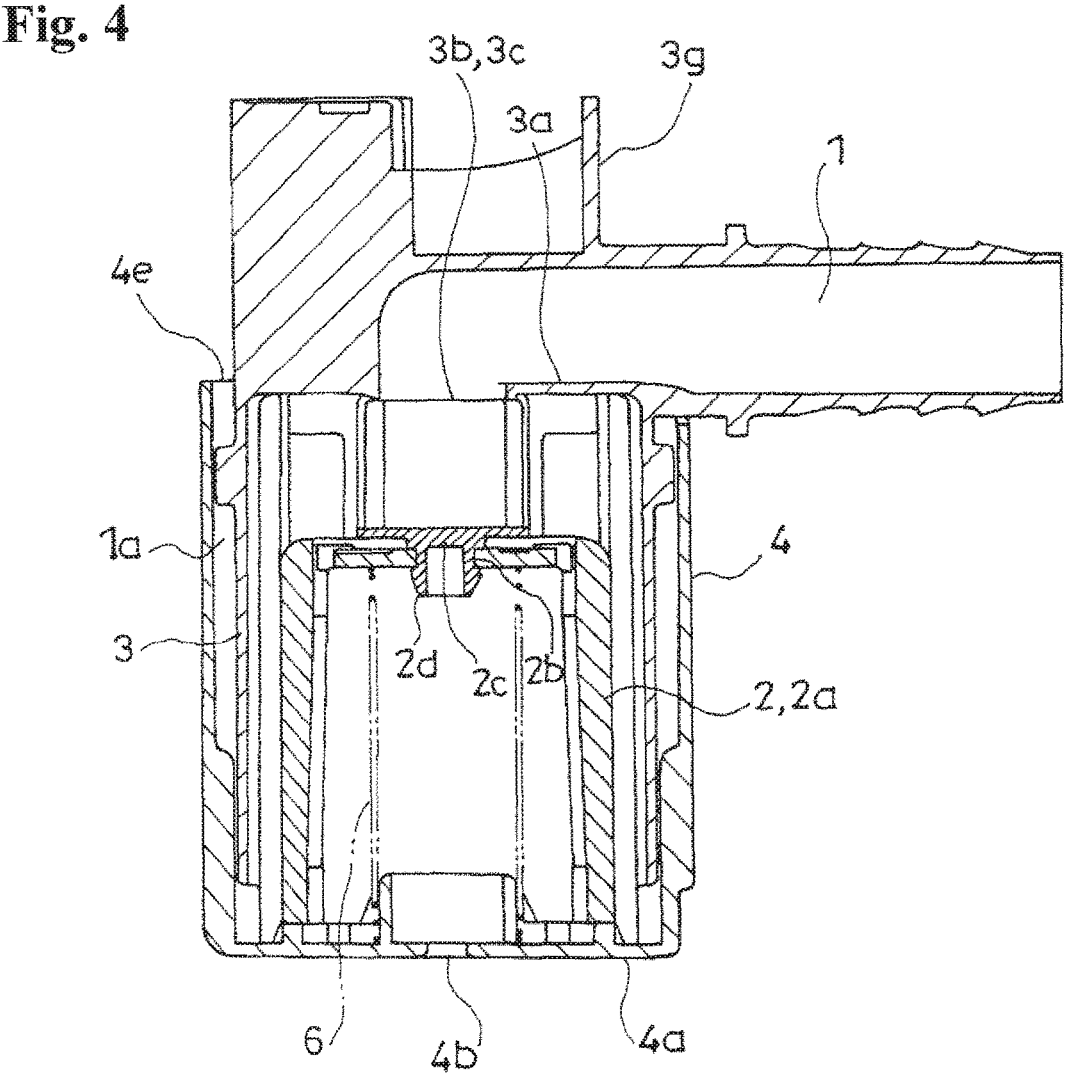
FIG. 4 is a cross-sectional view taken along a line A-A in FIG. 3, and shows an open valve state wherein a float valve is located in a lower position.
Figure 5:
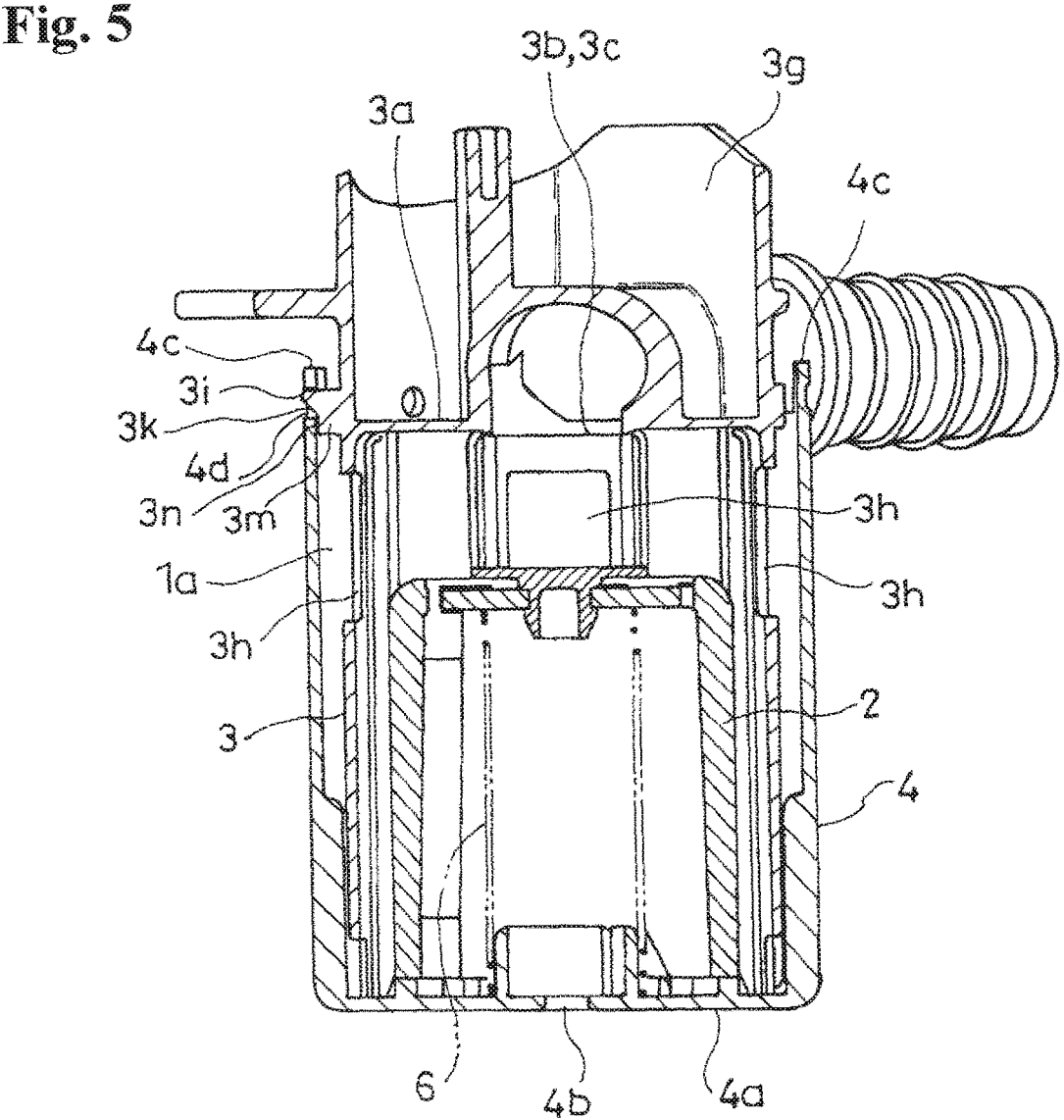
FIG. 5 is a cross-sectional view taken along a line B-B in FIG. 3, and shows the open valve state wherein the float valve is located in the lower position.
Figure 6:
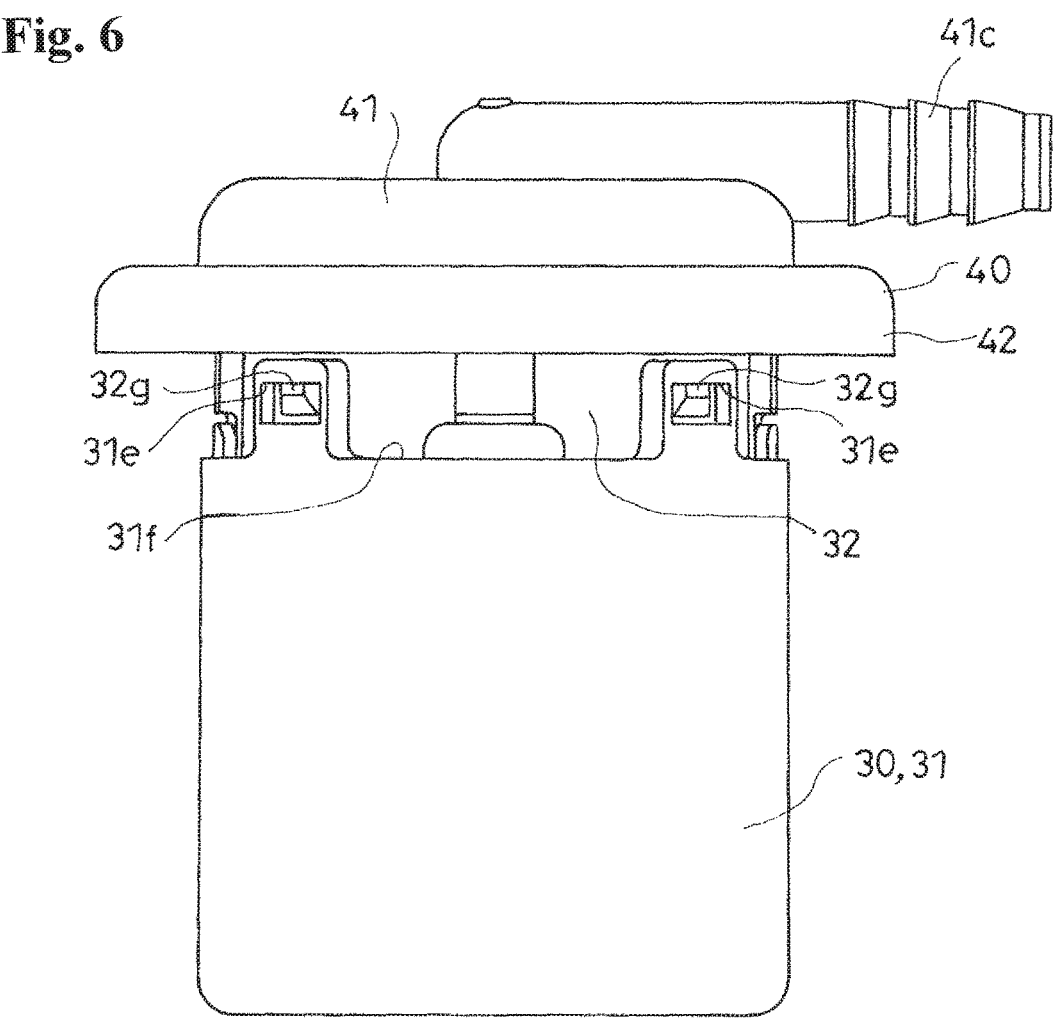
FIG. 6 is a side view of the valve device (a second example) according to another embodiment of the present invention.
Figure 7:
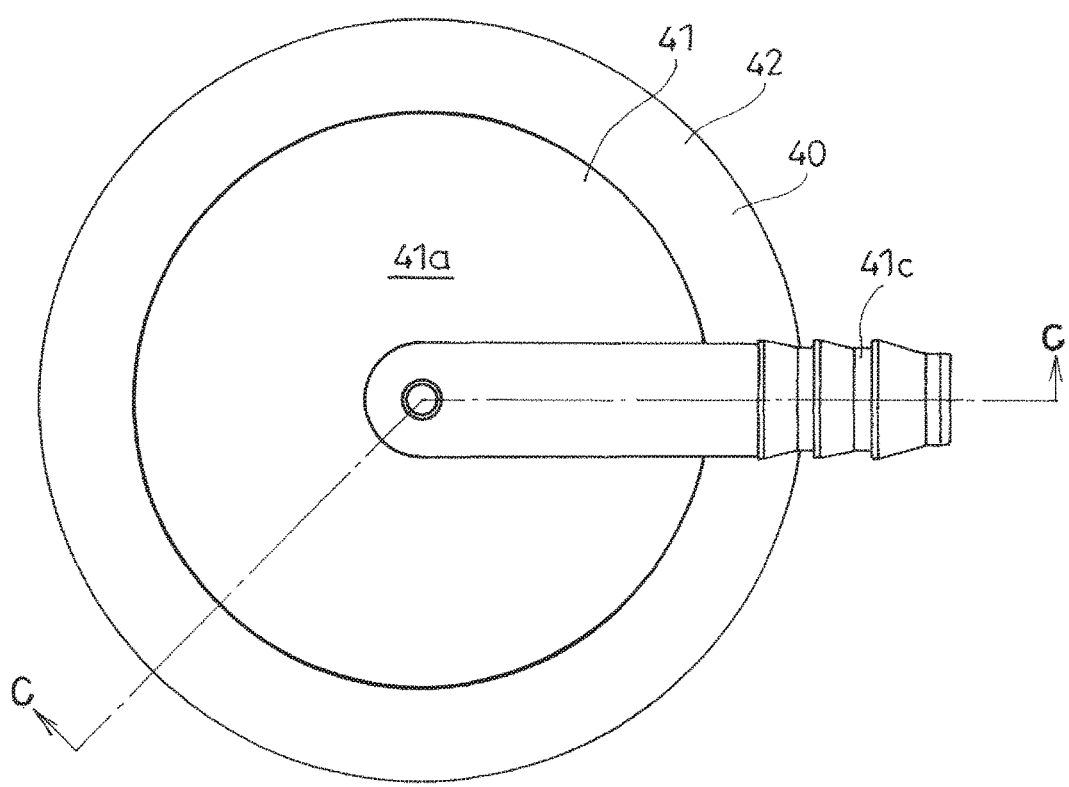
FIG. 7 is a plan view of the valve device of the second example.

As shown in FIG. 4, the inside case 3 includes a top portion 3a and a circular through hole 3c which becomes a valve opening 3b at a center of the top portion 3a, and substantially has a cylindrical shape wherein a lower end is open. As shown in FIG. 3, the inside case 3 comprises an exhaust port 3d extending horizontally by integrally connecting a pipe one end 3e to the center of the top portion 3a on an upper face side of the top portion 3a, and having a pipe shape wherein a pipe other end 3f is a connection portion to one end of a pipe member (not shown in the drawings) forming one portion of the ventilation flow channel 1. The pipe one end 3e of the exhaust port 3d communicates with the valve opening 3b, and thereby, the inside case 3 communicates with an outside of a tank through the exhaust port 3d. As shown in FIG. 5, an upper face of the top portion 3a is surrounded by a circular wall portion 3g. As shown in FIG. 3, a pipe one end 3e side of the exhaust port 3d is positioned on an inside of the circular wall portion 3g, and a pipe other end 3f side is positioned on an outside of the circular wall portion 3g. As shown in FIG. 2, the attachment portion 5 has an ear plate shape projecting horizontally from an outer face of the circular wall portion 3g.

In a side portion of such inside case 3, there are provided through holes 3h. Also, engagement claws 3i relative to the outside case 4 are provided directly above such through holes 3h.

In the illustrated example, the through holes 3h are formed at a portion which is above a position in an approximately middle in an up-and-down direction of the side portion positioned between the top portion 3a and the lower end of the inside case 3, and is below the top portion 3a. In the illustrated example, such through holes 3h are formed in the side portion at four portions at intervals of 90 degrees in a direction of circling a cylinder axis of the inside case 3. Each through hole 3h respectively has a square window shape wherein an upper side and a lower side are disposed horizontally, and a left side and a right side are arranged vertically.

Also, in the illustrated example, as shown in FIG. 2, the engagement claws 3i are respectively formed directly above the four through holes 3h. In the illustrated example, such engagement claws 3i have a structure of projecting in an eave shape further to a side from a projecting end face of pedestal-shaped projecting portions 3m projecting to the side from an outer face of the side portion of the inside case 3. The pedestal-shaped projecting portions 3m include a horizontal upper face and lower face, vertical left and right side faces, and a vertical projecting end face. The lower face of the pedestal-shaped projecting portion 3m has a level approximately equal to the top portion 3a. The engagement claw 3i is formed along a right-and-left direction of the pedestal-shaped projecting portion 3m, and includes an upper face 3j positioned on the same face as the upper face of the pedestal-shaped projecting portion 3m. An interval is formed between a lower face 3k of the engagement claw 3i and the lower face of the pedestal-shaped projecting portion 3m, and the projecting end face of the pedestal-shaped projecting portion 3m positioned inside the interval becomes an abutment face 3n relative to an inner face of a side portion of the outside case 4 in a state wherein the inside case 3 and the outside case 4 are combined (FIG. 5). The lower face 3k of the engagement claw 3i becomes an inclination face gradually reducing a thickness in an up-and-down direction of the engagement claw 3i toward a tip of the engagement claw 3i.

On the other hand, as shown in FIG. 1, the outside case includes a bottom portion 4a, and substantially has a cylindrical shape wherein an upper end is open. A through hole 4b is formed at a center of the bottom portion 4a. On the upper end of the outside case 4, there are formed projecting pieces 4c projecting upward at four portions at intervals of 90 degrees in a direction of circling a cylinder axis of the outside case 4. In each projecting piece 4c, there is formed an engagement hole 4d relative to the engagement claw 3i. An upper open end 4e orthogonal to the cylinder shaft is formed between adjacent projecting pieces 4c.

As shown in FIG. 4, an inner diameter of the outside case 4 is larger than an outer diameter of the inside case 3. The outside case 4 and the inside case 3 are combined by inserting the inside case 3 into a position wherein the lower end abuts against the bottom portion of the outside case 4 with the lower end thereof first from the upper open end 4e of the outside case 4 from a state wherein the float valve 2 is housed inside the inside case 3.

Specifically, in the illustrated example, immediately before the inside case 3 is completely inserted into the outside case 4 as described above, the projecting piece 4c abuts against the lower face 3k which becomes the inclination face of the engagement claw 3i, and the projecting piece 4c is elastically deformed outwardly to allow the inside case 3 to be inserted further. Also, at an entering completion position, each engagement claw 3i matches the corresponding engagement hole 4d, and an elastic return of the projecting piece 4c is carried out, so that each engagement claw 3i engages the corresponding engagement hole 4d. Thereby, the combined state between the outside case 4 and the inside case 3 is maintained.

Then, as shown in FIG. 4, between the side portion of the outside case 4 and the side portion of the inside case 3 combined in the aforementioned manner, there is formed a flow channel 1a forming one portion of the ventilation flow channel 1 over an entire circumference.

The float valve 2 comprises a float main member 2a and a valve member 2c attached to an upper portion of the float main member 2a.

In the illustrated example, the float main member 2a substantially closes an upper end, and has a cylinder shape opening a lower end. The valve member 2c is made of rubber or plastic having a rubber-like elasticity, has a disk shape, and is attached to the float main member 2a by fitting a short cylindrical portion 2d projecting downwardly from a center of a lower face thereof into a through hole 2b formed at an upper end center of the float main member 2a. Inside the float main member 2a, there is housed a compression coil spring 6 wherein a spring upper end abuts against an upper end inner face of the float main member 2a, and a spring lower end abuts against the bottom portion 4a of the outside case 4 so as to always apply a certain urging force upwardly relative to the float valve 2.

A vertical size of the float valve 2 is shorter than a distance between the top portion 3a of the inside case 3 and the bottom portion 4a of the outside case 4, and an outer diameter of the float valve 2 is smaller than an inner diameter of the inside case 3.

As shown in FIG. 4 and FIG. 5, when the float valve 2 is in a lower position wherein a lower end thereof contacts the bottom portion 4a of the outside case 4, inside and outside of the tank can communicate through the upper open end 4e of the outside case 4, the flow channel 1a, the through hole 3h of the inside case 3, the valve opening 3b, and the exhaust port 3d. Here, in the present embodiment, the upper open end 4e of the outside case 4 is positioned above the through hole 3h of the inside case 3. Thereby, one portion of the ventilation flow channel 1 formed by the upper open end 4e, the flow channel 1a, the through hole 3h of the inside case 3, and the valve opening 3b meanders up and down so as to prevent an outflow of a fuel to the outside of the tank in a state before the float valve 2 sits onto the valve opening 3b as much as possible.

Especially, in the present embodiment, as shown in FIG. 2, the engagement claw 3i is formed directly above the through hole 3h, and such engagement claw 3i can function as an eave of the through hole 3h, so that even if the fuel in a liquid state enters into the flow channel 1a from the upper open end 4e before the float valve 2 sits onto the valve opening 3b, such fuel can be prevented from entering into the through hole 3h as much as possible.

When the fuel in the liquid state flows into the inside case 3 through the through hole 4b of the bottom portion 4a of the outside case 4, the float valve 2 rises up to a position wherein the valve member 2c provided on an upper portion thereof sits on an inner face of the top portion 3a of the inside case 3 circling the valve opening 3b as a valve seat. Thereby, the aforementioned communication of the inside and outside of the tank is blocked. When the fuel flows out of the inside case 3, the float valve 2 lowers again, so that the inside and outside of the tank can communicate again through the valve device.

Second Example

The valve device (a second example) shown in FIG. 6 to FIG. 10 is attached to an upper portion of a fuel tank T. The valve device comprises a structural member 40 of an attachment portion relative to the tank side having a size of blocking an attachment hole Ta formed on the upper portion of the fuel tank T; and an outside case 31 and an inside case 32 which can be inserted into the fuel tank T through the attachment hole Ta, and in a state wherein such outside case 31 and inside case 32 are inserted into the fuel tank T, an outer peripheral portion of the structural member 40 of the attachment portion is fixed on an outer face of the upper portion of the fuel tank T by welding and the like so as to be provided in the fuel tank T (see FIG. 8).

Such valve device comprises the float valve 2; an inside case 32 housing the float valve 2; an outside case 31 housing the inside case 32; and the structural member 40 of the attachment portion relative to the tank side. Such float valve 2, inside case 32, outside case 31, and structural member 40 are typically made of plastic.

The outside case 31 and the inside case 32 are assembled to form the flow channel 1a forming one portion of the ventilation flow channel 1 between the both cases.

Figure 9:
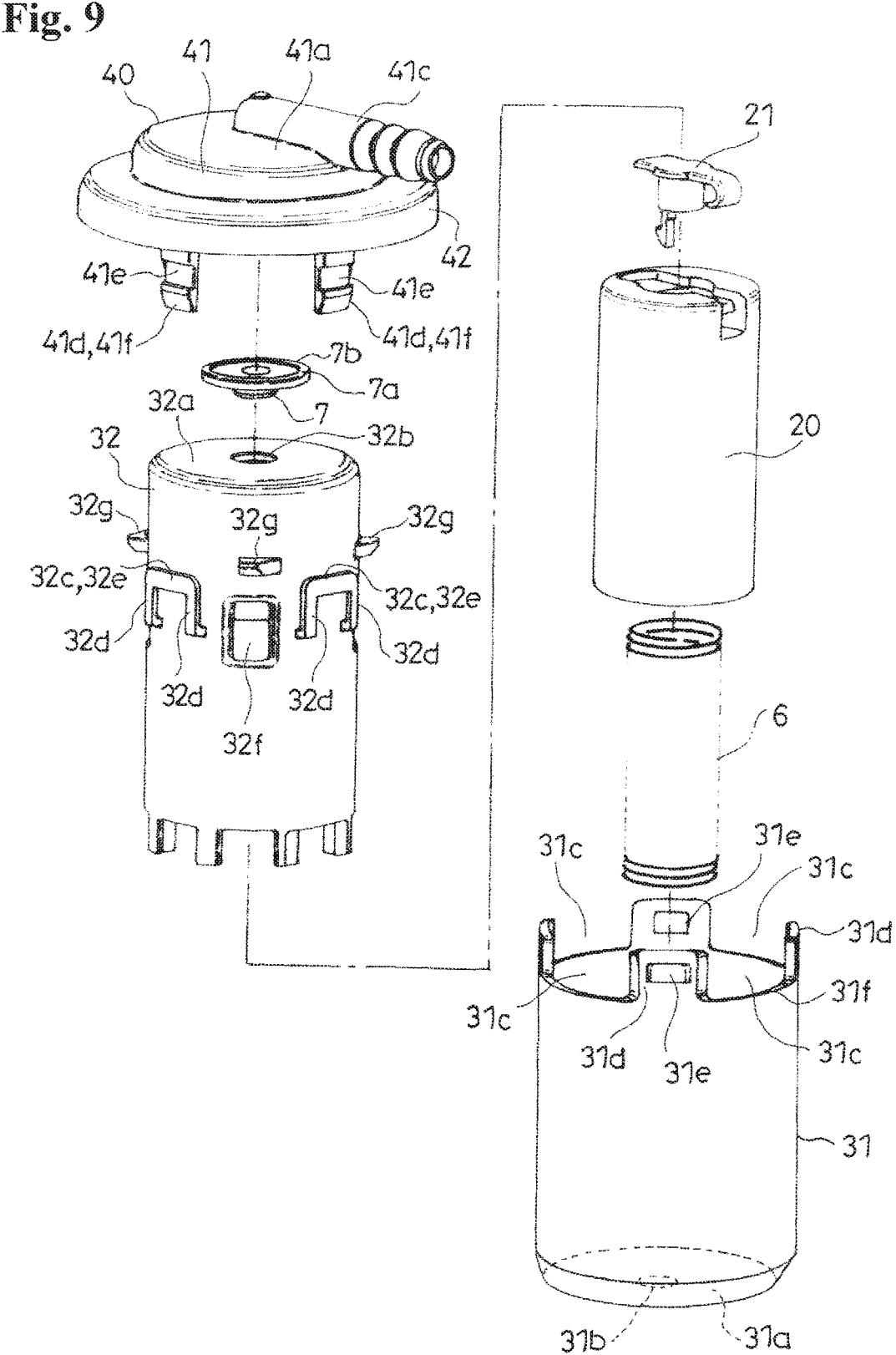
FIG. 9 is an exploded perspective view of the valve device of the second example.

The outside case 31 includes a bottom portion 31a, and a circular through hole 31b at a center of the bottom portion 31a, and substantially has a cylindrical shape wherein an upper end is open. As shown in FIG. 9, in an upper end portion of the outside case 31, there is formed a plurality of concave notch portions 31c, 31c with intervals in a direction of surrounding a cylinder shaft of the outside case 31, and the upper end portion of the outside case 31 has a crown shape. In a projecting-piece-like portion 31d remaining between adjacent concave notch portions 31c and 31c of the outside case 31, there is formed an engagement hole 31e.

On the other hand, as shown in FIG. 9, the inside case 32 includes a top portion 32a and a circular first through hole 32b at a center of the top portion 32a, and substantially has a cylindrical shape wherein a lower end is open. In a side portion of the inside case 32, there are formed engaged portions 32c relative to engagement pieces 41d of the structural member 40, through holes 32f, and engagement claws 32g relative to the engagement holes 31e of the outside case 31.

In the illustrated example, four engaged portions 32c are provided with an interval of 90 degrees in a direction of surrounding a cylinder shaft of the inside case 32. In each engaged portion 32c, a lower end is integrally connected to an outer face of the inside case 32, and the engaged portion 32c respectively comprises a pair of arm portions 32d and 32d extending upward with a gap between the pair of arm portions 32d and 32d and the outer face of the inside case 32; and bridge portions 32e ranging between upper ends of the pair of arm portions 32d and 32d.

Figure 10:
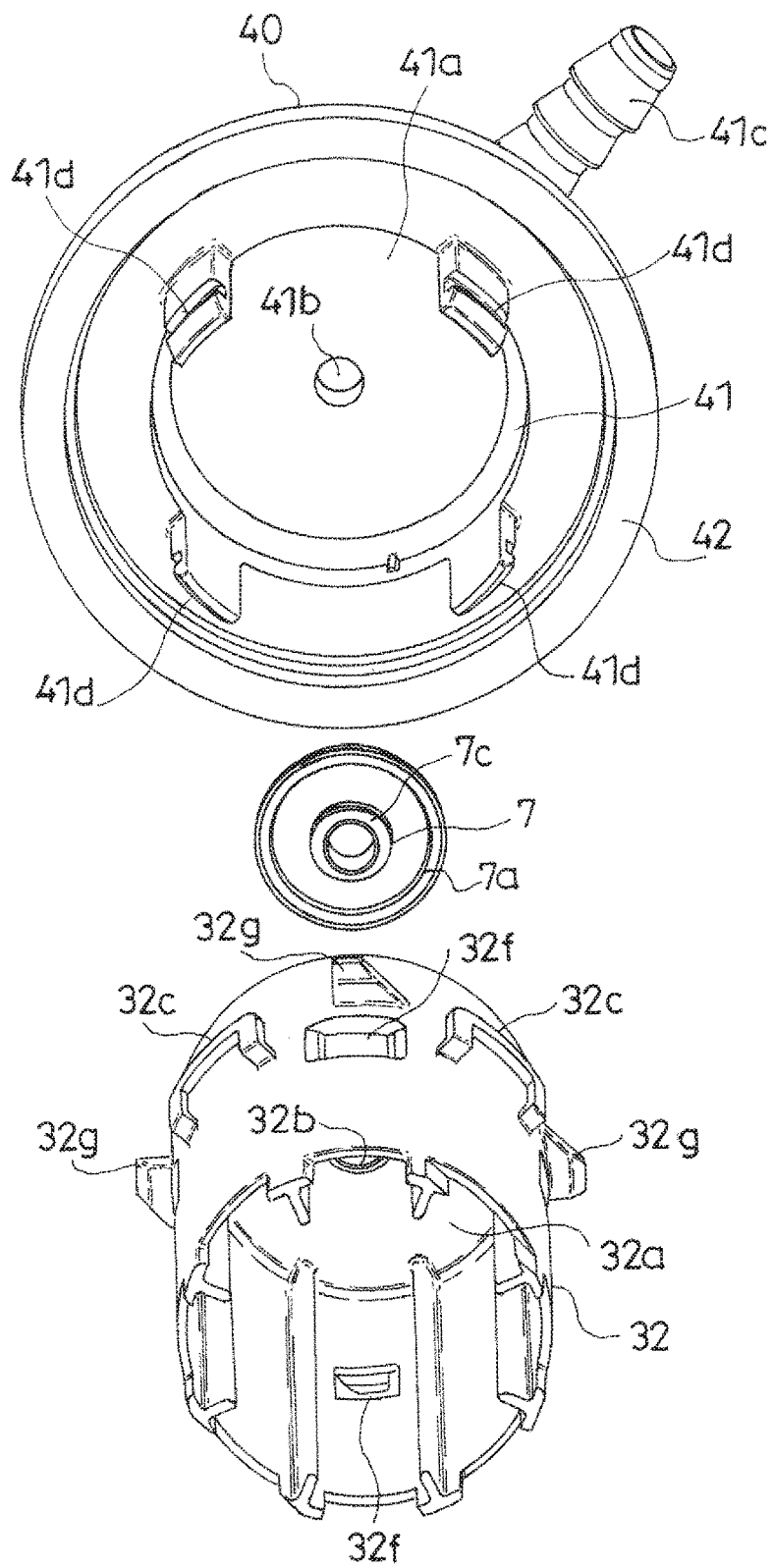
FIG. 10 is a perspective view showing a state wherein a structural member of an attachment portion and the inside case forming the valve device of the second example are separated.

As shown in FIG. 10, in the illustrated example, the through hole 32f is a square-shaped hole penetrating inside and outside of the inside case 32, and formed between the adjacent engaged portions 32c and 32c.

In the illustrated example, the engagement claws 32g project from the outer face of the inside case 32, and are respectively provided directly above the through holes 32f.

Figure 8:
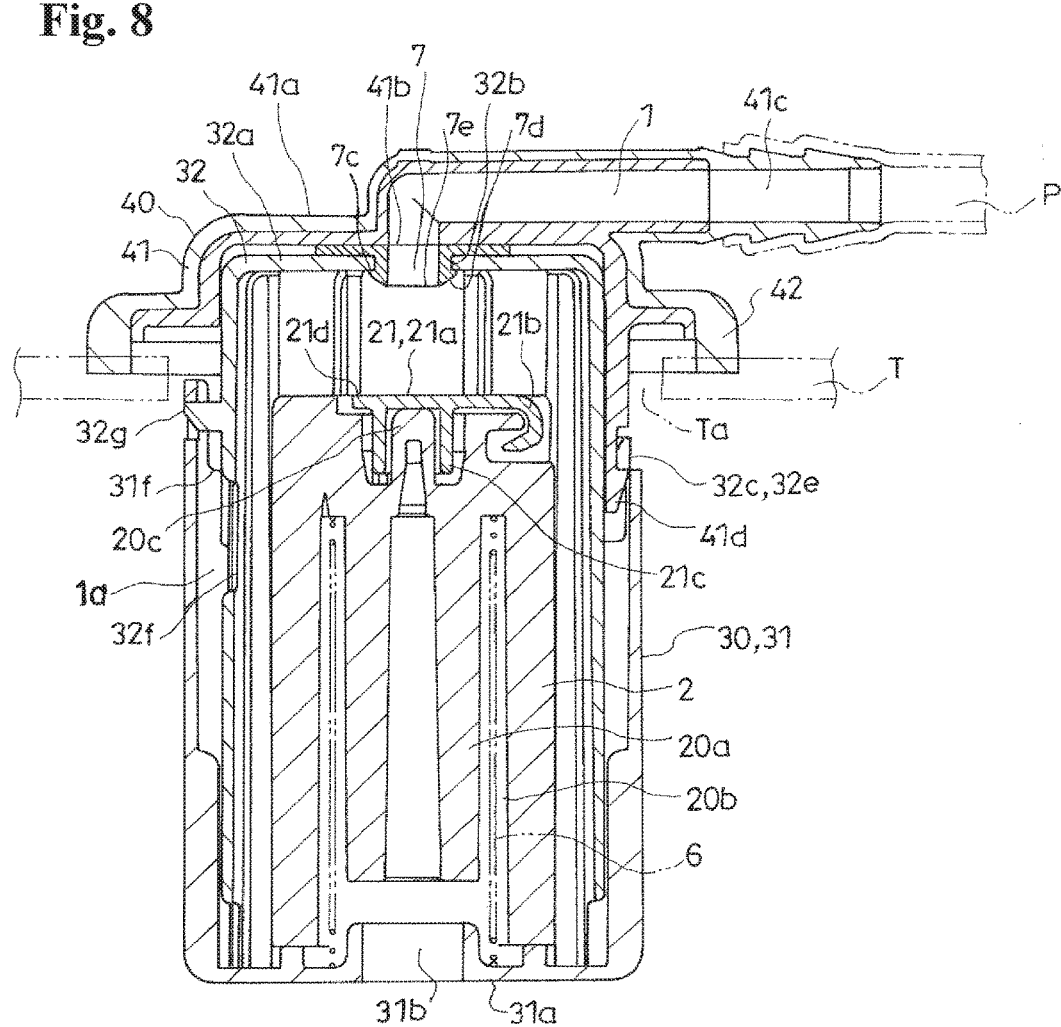
FIG. 8 is a cross-sectional view taken along a line C-C in FIG. 7, and shows the open valve state wherein the float valve is located in the lower position.

On the other hand, in the illustrated example, as shown in FIG. 8, the structural member 40 comprises a short cylindrical portion 41 wherein an upper end is closed and a lower end is open; and a flange portion 42 projecting outward from the lower end of the short cylindrical portion 41.

The short cylindrical portion 41 includes the upper end, i.e. a top portion 41a, and a circular second through hole 41b at a center of the top portion 41a. Such second through hole 41b extends horizontally by integrally connecting a pipe one end to a center of the top portion 41b on an upper face side of the top portion 41b of the short cylindrical portion 41, and a pipe other end communicates to the outside of the tank through an exhaust port 41c having a pipe shape which is a connection portion to one end of a pipe member P forming one portion of the ventilation flow channel 1.

As shown in FIG. 9, in the lower end of the short cylindrical portion 41 of the structural member 40, there are formed the engagement pieces 41d formed by elastic pieces 41e projecting downward by integrally connecting the upper end to the lower end of the short cylindrical portion 41, and projections 41f formed on a lower end outer side of the elastic pieces 41e. In the illustrated example, four engagement pieces 41d are provided corresponding to the engaged portions 32c with an interval of 90 degrees in a direction of surrounding a cylinder shaft of the short cylindrical portion 41 of the structural member 40.

The outside case 31 and the inside case 32 are combined such that the inside case 32 is inserted into the outside case 31 from an upper end side of the outside case 31 with the lower end of the inside case 32 first up to a position wherein the lower end of the inside case 32 hits the bottom portion 31a of the outside case 31. In such an insertion process, each projecting-piece-like portion 31d respectively abuts against the corresponding engagement claw 32g positioned directly above the through hole 32f positioned between the adjacent engaged portions 32c and 32c so as to elastically deform outward, and at a position wherein the inside case 32 is completely inserted, the projecting-piece-like portion 31d elastically returns to receive the engagement claw 32g into the window hole 31e to be engaged.

As shown in FIG. 8, an upper open end 31f (a level of a base portion of the projecting-piece-like portion 31d) of the outside case 31 is positioned below an upper end of the inside case 32 and above the through hole 32f.

Also, the inside case 32 and the structural member 40 are combined in such a way as to pinch one portion of the cylindrical seal member 7 fitted in the first through hole 32b to communicate the inner portion to the second through hole 41b, between the top portion 32a of the inside case 32 forming the inside case 32 wherein the first through hole 32b is formed, and the top portion 41a of the structural member 40 wherein the second through hole 41b is formed.

The cylindrical seal member 7 is made of rubber or plastic having the rubber-like elasticity. In the illustrated example, as shown in FIG. 9, such cylindrical seal member 7 includes an outer flange portion 7a having a circular shape at a cylinder upper end. On an upper face of the outer flange portion 7a, there is formed a circular projecting piece 7b. An outer diameter of the outer flange portion 7a is larger than a hole diameter of the first through hole 32b. As shown in FIG. 8, in an outer peripheral portion of the cylindrical seal member 7, and in a position of an approximately middle in an up-and-down direction thereof, there is formed a circular rising portion 7c. Between the circular rising portion 7c and the outer flange portion 7a, there is formed an interval having a size corresponding to a thickness of the top portion 32a of the inside case 32 forming the inside case 32. Between the circular rising portion 7c and the cylinder lower end of the cylindrical seal member 7, there is formed a circular inclined face 7d reducing an outer diameter of the cylindrical seal member 7 as coming closer to the cylinder lower end.

In the illustrated example, the cylindrical seal member 7 is fitted in the first through hole 32b from above with a cylinder lower end side thereof first. At a completely fitted position, the outer flange portion 7a of the cylindrical seal member 7 contacts an outer face of the top portion 32a of the inside case 32, and the circular rising portion 7c contacts an inner face of the top portion 32a of such inside case 32.

Thus, from a state wherein the cylindrical seal member 7 is fitted in the first through hole 32b, when an upper end side of the inside case 32 is entered into the short cylindrical portion 41 of the structural member 40 from below such that the engagement piece 41d of the structural member 40 enters into the inside of each engaged portion 32c of the inside case 32 respectively, the second through hole 41b is positioned directly above the upper end of the cylindrical seal member 7, and the outer flange portion 7a of the cylindrical seal member 7 is pinched by the outer face of the top portion 32a of the inside case 32, and a portion which is an inner face of the top portion 41a of the structural member 40 and surrounds the second through hole 41b.

In the present embodiment, a pinched state of one portion of such cylindrical seal member 7, i.e. a combined state of the inside case 32 and the structural member 40, is maintained by engaging the engagement piece 41d with the engaged portion 32c. When the inside case 32 enters the structural member 40 as mentioned above, the projection 41f abuts against the bridge portion 32e of the engaged portion 32c, and the elastic piece 41e and the arm portion 32d elastically deform to allow the inside case 32 to enter into the structural member 40, and when the inside case 32 is completely entered into the structural member 40, the projection 41f enters below the bridge portion 32e, and the elastic piece 41e and the arm portion 32d elastically return so that the projection 41f is caught on the bridge portion 32e. Thereby, the combined state of the inside case 32 and the structural member 40 is maintained (see FIG. 8).

As shown in FIG. 8, the float valve 2 comprises a float main member 20 and a valve member 21 tiltably provided at an upper portion of the float main member 20.

In the illustrated example, the float main member 20 includes an annular space 20b substantially closing an upper end and internally surrounding a core portion 20a, and has a cylinder shape opening the annular space 20b on a lower end side. In the annular space 20b, there is housed the compression coil spring 6 wherein a spring upper end abuts against an inner back portion of the annular space 20b, and a spring lower end abuts against the bottom portion 31a of the outside case 31 to always apply a certain amount of urging forces upward relative to the float valve 2.

The valve member 21 includes following respective portions (1) to (4).

(1) A seal portion 21a closing the first through hole 3b at a time of a rise of the float valve 2.

(2) A catching portion 21b caught on one portion of the float main member 20 and becoming a center of the tilting.

(3) An abutment portion 21c protruding on a back side of the seal portion 21a.

(4) A support point portion 21d abutting against the lower end of the cylindrical seal member 7 at a time of the tilting.

The abutment portion 21c has a cylinder shape. Then, in the valve device according to the present embodiment, in a state wherein an abutted portion 20c having a shaft shape formed in the upper portion of the float main member 20 is housed inside the abutment portion 21c, and the seal portion 21a is positioned horizontally, the valve member 21 is supported on the abutted portion 20c. Therewith, the abutment portion 21c abuts against the abutted portion 20c by the tilting to thereby move the valve member 21 in a horizontal direction.

In such valve device, the lower end of the cylindrical seal member 7 protruding downward from the inner face of the top portion 32a of the inside case 32 becomes a valve opening of the inside case 32 functioning as the valve seat 7e of the float valve 2.

As shown in FIG. 8, when the float valve 2 is located in the lower position wherein the lower end thereof contacts a bottom portion of the inside case 32, the inside and outside of the tank can communicate through the upper open end 31f of the outside case 31, the flow channel 1a, the through hole 32f of the inside case 32, the cylindrical seal member 7, the second through hole 41b, and the exhaust port 41c. The upper open end 31f is positioned above the through hole 32f of the inside case 32, and the through hole 32f of the inside case 32 is formed in the side portion of the inside case 32, so that one portion of the ventilation flow channel 1 formed by such upper open end 31f, the flow channel 1a, and the through hole 32f meanders up and down so as to prevent the outflow of the fuel in the liquid state to the outside of the tank in a state before the float valve 2 sits onto the valve seat 7e as much as possible.

Especially, in the present embodiment, the engagement claw 32g is formed directly above the through hole 32f, and such engagement claw 32g can function as the eave of the through hole 32f, so that even if the fuel in the liquid state enters into the flow channel 1a from the upper open end 31f before the float valve 2 sits onto the valve opening, such fuel can be prevented from entering into the through hole 32f as much as possible.

When the fuel in the liquid state flows into the inside case 32 through the through hole 31b of the bottom portion 31a of the outside case 31, the float valve 2 rises up to the position wherein the valve member 21 provided on the upper portion thereof sits on the valve seat 7e as the cylinder lower end of the cylindrical seal member 7 facing inside the inside case 32 as the valve seat 7e. Thereby, the aforementioned communication of the inside and outside of the tank is blocked. When the fuel flows out of the inside case 32, the float valve 2 lowers again, so that the inside and outside of the tank can communicate again through the valve device.

In the valve device according to the present embodiment, the cylindrical seal member 7 can seal between the top portion 41a of the structural member 40 and the cylindrical seal member 7, and between the cylindrical seal member 7 and the top portion 32a of the inside case 32 forming the inside case 32 in an airtight state. In the illustrated example, due to the pinching, in the elastically deformed state, the outer flange portion 7a of the cylindrical seal member 7 is pressed against a hole edge portion of the second through hole 41b of the top portion 41a of the structural member 40 and a hole edge portion of the first through hole 32b of the top portion 32a of the inside case 32 forming the inside case 32, and the ventilation between the valve device and the outside of the tank is carried out only through the inner portion of the cylindrical seal member 7. Also, in the valve device according to the present embodiment, the cylindrical seal member 7 serves as the valve seat 7e of the float valve 2 as well. Thereby, in the valve device according to the present embodiment, parts comprising a seal function can be formed by one cylindrical seal member 7 so as to minimize the number of component parts of this kind of valve device, and further reduce costs.

When the fuel flows into the inside case 32, the seal portion 21a of the valve member 21 of the float valve 2 rising by the aforementioned flowing blocks the lower end of the cylindrical seal member 7, i.e. the valve seat 7e so as to prevent the fuel from flowing to the outside of the tank. While the float valve 2 can move down when the fuel flows out of the inside case 32, since the float main member 20 and the valve member 21 are linked on the catching portion 21b side, and are not linked on a support point portion 21d side, in the valve member 21, the support point portion 21d abuts against the lower end of the cylindrical seal member 7 to tilt such that the catching portion 21b side becomes an inclined bottom as a support point of the aforementioned abutting portion. Therewith, while the valve member 21 contacts the abutment portion 21c against the abutted portion 20c by the aforementioned tilting, since a position in the horizontal direction of the abutted portion 20c does not change, the valve member 21 moves in the horizontal direction while tilting as mentioned above. Thereby, even in a case wherein the inside of the tank has a high pressure, and in a case wherein the cylindrical seal member 7 and the seal portion 21a are made of a material which can be easily attached, a separation between the cylindrical seal member 7 and the seal portion 21a, i.e. a smooth opening of the valve device can be provided.

Also, in the second example, the engaged portion 32c is positioned below the upper open end 31f of the outside case 31. Thereby, the engaged portion 32c of the inside case 32 engaged with the engagement piece 41d of the structural member 40 of the attachment portion is covered with the outside case 31, so that an elastic deformation of the engaged portion 32c in a direction of releasing such an engagement is suppressed, and an engagement state between the structural member 40 and the inside case 32 can be stably secured.

Also, in the second example, a plurality of through holes 32f is provided, and the engaged portion 32c is positioned between adjacent through holes 32f in a peripheral direction (the direction of surrounding the cylinder shaft) of the inside case 32. Thereby, the through hole 32f can be formed on an upper side of the valve device as much as possible, and can appropriately adapt a high draft in the fuel tank.

Incidentally, obviously, the present invention is not limited to the embodiments explained hereinabove, and includes all embodiments which can obtain the object of the present invention.

EXPLANATION OF SYMBOLS 1 a ventilation flow channel
1a a flow channel
2 a float valve
3 an inside case
3b a valve opening
3h a through hole
3i an engagement claw
4 an outside case
4a a bottom portion
5 an attachment portion Incidentally, all contents of the specification, claims, drawings, and abstract of Japanese Patent Application No. 2015-060481 filed on Mar. 24, 2015 are cited in their entireties herein and are incorporated as a disclosure of the specification of the present invention.

What is claimed is:

1. A valve device forming a ventilation flow channel for a fuel tank, comprising:
  a float valve;
  an inside case in which the float valve is housed, including a valve opening relative to the float valve at an upper portion thereof, a through hole communicating between an inside and an outside of the inside case, and an engagement claw protruding outwardly from an outer portion of the inside case and disposed directly above the through hole as an eave of the through hole;
  an outside case having a bottom portion and an engagement hole engaging the engagement claw of the inside case, and receiving the inside case from an upper open end to form a flow channel between the outer portion of inside case and an inner portion of the outside case; and
  an attachment portion relative to a tank side,
  wherein the flow channel becomes one portion of the ventilation flow channel.

2. A valve device according to claim 1, wherein the upper open end of the outside case is positioned at an upper side relative to the through hole of the inside case.

3. A valve device according to claim 1, wherein the through hole is arranged above the float valve so that the ventilation flow channel is formed with the flow channel, the through hole, and the valve opening when the float valve sits onto the valve opening.

4. A valve device according to claim 1, wherein the inside case further includes a projecting portion projecting outwardly from the outside portion of the inside case under the engagement claw and integrally formed with the engagement claw, and the projecting portion has a projection length shorter than that of the engagement claw, and includes a lower lace positioned at a height same as a top portion of the inside case in a vertical direction, and an abutment face arranged at an outer side thereof and abutting against the inner portion of the outside case.

5. A valve device forming a ventilation flow channel for a fuel tank, comprising:

a float valve;

an inside case including a valve opening relative to the float valve at an upper portion thereof, and housing the float valve;

an outside case receiving the inside case from an upper open end, and having a bottom portion; and an attachment portion relative to a tank side, wherein a flow channel which becomes one portion of the ventilation flow channel is formed between a side portion of the inside case and a side portion of the outside case, the side portion of the inside case includes a through hole, and further, an engagement claw relative to the outside case directly above the through hole, the outside case includes an engagement hole relative to the engagement claw of the inside case, and the side portion of the inside case includes an engaged portion receiving an engagement piece provided in a structural member of the attachment portion by an elastic deformation, and engaging the engagement piece by an elastic return at a receiving end position.

6. A valve device according to claim 5, wherein the engaged portion is positioned on a lower side relative to the upper open end of the outside case.

7. A valve device according to claim 5, wherein the through hole includes plural holes, and the engaged portion is positioned between adjacent through holes in a peripheral direction of the inside case.

* * * * *